Sept. 19, 1961     E. TURULA ET AL     3,000,259

VARIABLE MAGNIFICATION LENS SYSTEM

Filed March 7, 1960     2 Sheets-Sheet 1

Fig. 1

| EF varies, 30.19 to 150.54 mm. | | | | |
|---|---|---|---|---|
| Lens | $N_D$ | V | Radii, mm. | Thicknesses, mm. |
| 1 | 1.517 | 64.5 | $R_1 = +\ 71.5$ | $T_1 = 9.5$ |
| 2 | 1.617 | 36.6 | $R_2 = -\ 50.0$ | $T_2 = 2.0$ |
| | | | $R_3 = -\ 205.74$ | $S_1$ = variable |
| 3 | 1.720 | 29.3 | $R_4 = +\ 272.0$ | $T_3 = 6.5$ |
| 4 | 1.541 | 59.9 | $R_5 = -\ 72.75$ | $T_4 = 2.5$ |
| | | | $R_6 = +\ 27.5$ | $S_2 = 7.0$ |
| | | | $R_7 = -\ 40.25$ | |
| 5 | 1.523 | 50.6 | $R_8 = +\ 234.0$ | $T_5 = 2.0$ |
| | | | | $S_3$ = variable |
| 6 | 1.617 | 36.6 | $R_9 = +\ 177.3$ | $T_6 = 2.05$ |
| 7 | 1.517 | 64.5 | $R_{10} = +\ 50.0$ | $T_7 = 7.25$ |
| | | | $R_{11} = -\ 71.5$ | $S_4 = 0.5$ |
| 8 | 1.6142 | 59.2 | $R_{12} = +\ 35.0$ | $T_8 = 6.95$ |
| | | | $R_{13} = -\ 447.5$ | $S_5 = 8.93$ |
| 9 | 1.6884 | 30.9 | $R_{14} = -\ 42.6$ | $T_9 = 5.46$ |
| | | | $R_{15} = +\ 48.0$ | $S_6 = 7.44$ |
| 10 | 1.6200 | 57.0 | $R_{16} = -\ 512.0$ | $T_{10} = 4.46$ |
| | | | $R_{17} = -\ 37.2$ | $S_7 = 2.06$ |
| 11 | 1.6200 | 57.0 | $R_{18} = +\ 99.0$ | $T_{11} = 4.46$ |
| | | | $R_{19} = -\ 155.0$ | BF = 46.05 |

Fig. 2

3,000,259
VARIABLE MAGNIFICATION LENS SYSTEM
Eugene Turula and Geraldine B. Lynch, Rochester, N.Y., assignors to Revere Camera Company, Chicago, Ill., a corporation of Delaware
Filed Mar. 7, 1960, Ser. No. 13,081
2 Claims. (Cl. 88—57)

The present invention relates to variable magnification optical systems and, more particularly, to such optical systems which may be used alone in conjunction with a screen or which may be used together with another optical system, such as a camera lens system, to produce an image of continuously variable size of an object at a fixed distance from the system. The type of variable magnification system herein disclosed may be desirably used, for example, in or with a stationary television transmitting camera in order to increase or decrease continuously the size of the image, on the film or other image receiving device, of objects in the scene toward which the camera is directed, and thereby to give the impression when the film is projected, or the television receiver is viewed, that the viewpoint approaches or recedes from objects in the scene. Such a variable magnification optical system is commonly referred to as a "zoom" lens.

An object of the invention is to provide a new and improved optical system having a continuously variable magnification through a wide range.

Another object is to provide a variable magnification lens system which is comparatively simple, and which is easy and inexpensive to manufacture, although having relatively high image quality.

A further object is to provide a variable magnification or "zoom" lens system particularly adapted and suitable for self-contained motor-driven operation controlled from a remote point, thus constituting a unit which may be conveniently referred to as an automatic zoom lens or, for short, an auto zoom lens.

These and other desirable objects may be attained in the manner disclosed as an illustrative embodiment of the invention in the following description and in the accompanying drawings forming a part hereof, in which:

FIG. 1 is a diagrammatic view of an optical system according to a preferred form of the present invention; and FIG. 2 is a table of numerical data with respect to one specific embodiment of such an optical system.

The lens of the present invention comprises what may be called for convenience a front group or front member, axially alined with and spaced forwardly from what may be called a rear group or rear member. In the preferred form of the invention, the front member or group is made up of seven lens elements, of which elements 1 and 2 (numbering the elements consecutively from front or rear) are cemented together to form a doublet which may be referred to as component $a$. Elements 3 and 4 are likewise cemented together to form a doublet which may be called component $b$. Element 5 is a single air-spaced element, but may be referred to for convenience as component $c$. Hence element 5 and component $c$ mean the same thing. Elements 6 and 7 are cemented together to form a doublet which may be called component $d$, constituting the last or rear component of the above-mentioned front group or front member of the whole lens.

The rear member or rear group is capable of considerable variation. Subject only to the limitation that the equivalent focal length of the rear group is chosen so as to cover a total angular field of 30 degrees or less, and that the rear group as a whole is suitably designed to compensate for the aberrations of the front group, it may take many possible forms. Thus the rear group may be anything from a comparatively simple doublet to a highly corrected photographic lens of several elements. Merely for the sake of giving an illustrative example, the rear group as here shown is composed of four elements, all air spaced, and conveniently numbered as elements 8 to 11, inclusive, of the complete exemplary lens.

To obtain the zoom effect or variable magnification effect, components $b$ and $c$ are together moved axially in fixed relation to each other, and component $a$ is also moved axially but in variable or differential relation to the joint axial movements of components $b$ and $c$, while component $d$ and the entire rear member or group remain axially immovable.

To focus the lens upon an object at a finite distance, component $a$ is moved axially, independently of all other components or elements.

In this disclosure, the individual lens elements are consecutively numbered 1 to 11 from front to rear, as already mentioned. The radii of curvature R, the axial thicknesses T of the lens elements, and the spacings S between elements, are all expressed in the customary manner, with the usual subscripts to identify the particular surface, lens thickness, or air space referred to, numbered consecutively from front to rear. As usual in this art, a single surface number is assigned to cemented surfaces common to two elements. Thus $R_2$ indicates the common radius of the rear surface of element 1 and the front surface of element 2; $R_5$ indicates the common radius of the rear surface of element 3 and the front surface of element 4; etc. The plus and minus values of the radii R indicate surfaces respectively convex and concave toward the front.

The respective refractive indices, expressed with references to the spectral D line of sodium, are indicated by N, and the dispersive indices or Abbé numbers are indicated by V. The diameters of the respective lens elements are indicated by D. The focal lengths of certain individual lenses are indicated by F with a numerical subscript corresponding to the number of the particular lens element, and the equivalent focal lengths of certain components or groups of elements are indicated by F with a lettered subscript corresponding to the identifying letter of the particular component or group. For purposes of this notation, the entire rear group or rear member may be called group $e$, so that $F_e$ designates the equivalent focal length of the rear group (elements 8–11) as a whole. For convenience, the equivalent focal length of components $b$ and $c$ (elements 3–5) taken as a whole may be arbitrarily designated as $F_g$. The equivalent focal length of components $a$, $b$, and $c$ (elements 1–5) taken as a whole is arbitrarily designated $F_h$. The equivalent focal length of components $b$, $c$, and $d$ (elements 3–7) taken as a whole is arbitrarily designated $F_k$. A positive value of F indicates a positive or converging lens (or combination of lenses) and a negative value indicates a negative or diverging lens or combination. The symbols FF and BF designate respectively the front focus and the back focus of the particular lens or component or group indicated by the subscript used with the symbol.

As customary in this art, the front focus (FF) means the distance measured from the principal focus in the front space to the vertex of the front surface of the lens element or group of elements under consideration, and the back focus (BF) means the distance measured from the vertex of the back surface of the lens or group of lenses under consideration to the principal focus located in the back space. In some instances, the symbol EF is used to mean equivalent focal length, although it should be understood that F alone (without the prefix E) also means equivalent focal length, when used with respect to a component or group including more than a single lens element.

According to the present invention, good results are attained by using a lens having the general characteristics mentioned above, when the below-indicated variable factors are kept within the following ranges, viz:

Table 1

$F_a$ is arbitrarily chosen at such value as will maintain diameters and overall length of the system within reasonable limits. In the specific example here given, $F_a$ is approximately 1.93 $F_e$, but may vary from about 0.5 $F_e$ to 5 $F_e$, and the other variables are as follows:

$$-0.4\ F_a < F_b < -1.0\ F_a$$
$$-0.4\ F_a < F_c < -1.0\ F_a$$
$$0.7\ F_a < F_d < 1.3\ F_a$$
$$-0.15\ F_b < F_g < -0.5\ F_a$$
$$0.7\ F_b < F_c < 1.3\ F_b$$

The above data give the ranges of variation acceptable for purposes of the present invention, expressed in terms of focal length. Viewing the variables from another aspect, the acceptable ranges or limits for purposes of the present invention may also be expressed in terms of relationship of radii of curvature of lens surfaces (of the front group) to certain focal lengths, as follows:

Table 2

$$0.408\ F_a < R_1 < 0.73\ F_a$$
$$-0.327\ F_a < R_2 < -0.571\ F_a$$
$$-1.02\ F_a < R_3 < \infty$$
$$0.816\ F_a < R_4 < \infty$$
$$-1.42\ F_b < R_4 < \infty$$
$$-0.408\ F_a < R_5 < -0.735\ F_a$$
$$0.712\ F_b < R_5 < 1.28\ F_b$$
$$0.163\ F_a < R_6 < 0.286\ F_a$$
$$-0.285\ F_b < R_6 < -0.498\ F_b$$
$$-0.163\ F_a < R_7 < -0.65\ F_a$$
$$0.305\ F_c < R_7 < 1.22\ F_c$$
$$0.816\ F_a < R_8 < \infty$$
$$-1.53\ F_c < R_8 < \infty$$
$$0.816\ F_a < R_9 < \infty$$
$$0.864\ F_d < R_9 < \infty$$
$$0.327\ F_a < R_{10} < 0.571\ F_a$$
$$0.345\ F_d < R_{10} < 0.604\ F_d$$
$$-0.408\ F_a < R_{11} < -0.735\ F_a$$
$$-0.432\ F_d < R_{11} < -0.777\ F_d$$

It is also possible to express the acceptable limits of radii of curvature of lens surfaces in the form of linear dimensions (e.g., millimeters) with respect to a zoom lens whose equivalent focal length is variable between stated linear limits. Thus the following table gives the limits of the radii of curvature of the lens surfaces (of the elements of the front group or member) expressed in millimeters, for a variable magnification lens whose equivalent focal length is variable between the limits of approximately 30 mm. and 150 mm.

Table 3

50 mm. $< R_1 <$ 90 mm.
$-40$ mm. $< R_2 < -70$ mm.
$-125$ mm. $< R_3 < \infty$
100 mm. $< R_4 < \infty$
$-50$ mm. $< R_5 < -90$ mm.
20 mm. $< R_6 <$ 35 mm.
$-20$ mm. $< R_7 < -80$ mm.
100 mm. $< R_8 < \infty$
100 mm. $< R_9 < \infty$
40 mm. $< R_{10} <$ 70 mm.
$-50$ mm. $< R_{11} < -90$ mm.

In this Table 3 and in preceding Table 2, the limits are set on the assumption that the respective elements are made of glass having approximately the N and V characteristics indicated below in Table 4.

A specific example of a lens whose variables fall within the above mentioned limits and which gives excellent results according to the present invention, may be constructed in accordance with the numerical data given in the following Table 4 supplemented by the spacing information given in Table 5. The various symbols in the tables have the meanings explained above. All dimensions of D, R, T, and S in these tables are given in millimeters, for a complete lens whose EF varies between the limits of 30.19 mm. and 150.54 mm. and whose BF (of the complete system) remains constant at 46.05 mm. For lenses having different values of EF and BF, the other dimensions may be varied in proportion.

Table 4

| Lens | N | V | D | Radii | Thickness |
|---|---|---|---|---|---|
| 1 | 1.517 | 64.5 | 43.5 | $R_1 = +71.5$ | $T_1 = 9.5$ |
|   |       |      |      | $R_2 = -50.0$ | $T_2 = 2.0$ |
| 2 | 1.617 | 36.6 | 43.5 | $R_3 = -205.74$ | |
|   |       |      |      |                 | $S_1 =$ variable per Table 5 |
|   |       |      |      | $R_4 = +272.0$  | |
| 3 | 1.720 | 29.3 | 38.0 | $R_5 = -72.75$  | $T_3 = 6.5$ |
| 4 | 1.541 | 59.9 | 38.0 |                 | $T_4 = 2.5$ |
|   |       |      |      | $R_6 = +27.5$   | |
|   |       |      |      |                 | $S_2 = 7.0$ |
|   |       |      |      | $R_7 = -40.25$  | |
| 5 | 1.523 | 50.6 | 38.0 |                 | $T_5 = 2.0$ |
|   |       |      |      | $R_8 = +234.0$  | |
|   |       |      |      |                 | $S_3 =$ variable per Table 5 |
|   |       |      |      | $R_9 = +177.3$  | |
| 6 | 1.617 | 36.6 | 25.0 | $R_{10} = +50.0$ | $T_6 = 2.05$ |
| 7 | 1.517 | 64.5 | 25.0 | $R_{11} = -71.5$ | $T_7 = 7.25$ |
|   |       |      |      |                  | $S_4 = 0.5$ |
|   |       |      |      | $R_{12} = +35.0$ | |
| 8 | 1.6142 | 59.2 | 26.0 | $R_{13} = -447.5$ | $T_8 = 6.95$ |
|   |       |      |      |                    | $S_5 = 8.93$ |
|   |       |      |      | $R_{14} = -42.6$  | |
| 9 | 1.6884 | 30.9 | 26.0 | $R_{15} = +48.0$  | $T_9 = 5.46$ |
|   |       |      |      |                   | $S_6 = 7.44$ |
|   |       |      |      | $R_{16} = -512.0$ | |
| 10 | 1.6200 | 57.0 | 26.0 | $R_{17} = -37.2$ | $T_{10} = 4.46$ |
|   |       |      |      |                   | $S_7 = 2.06$ |
|   |       |      |      | $R_{18} = +99.0$  | |
| 11 | 1.6200 | 57.0 | 26.0 | $R_{19} = -155.0$ | $T_{11} = 4.46$ |

The front group or member, constituting elements 1–7, is useful with other forms of rear groups or members than the specific form indicated by elements 8–11 in the above table.

The specific example in accordance with foregoing Table 4 has the following additional characteristics:

$F_a = 122.5$ mm.  $F_b = -70.27$ mm.  $F_c = -65.5$ mm.
$F_d = 115.8$ mm.  $F_e = 63.44$ mm.  $BF_e = 46.05$ mm.

For minimum vignetting, the diaphragm or stop should be placed in the space $S_3$, as close as possible to lens element 6. The lens works at maximum aperture of $f/2.7$ when adjusted for an equivalent focal length (of the entire lens system) of about 30 millimeters. In the focal length range of about 120 to 150 millimeters, it works at an aperture of at least $f/3.5$ or better.

Typical examples of the proper settings of the variable spacings $S_1$ and $S_3$ to produce various typical equivalent focal lengths of the lens, are given in the following Table 5. The data in Table 5 are on the assumption that component $a$ is set for focusing on infinity. For focusing on closer objects, the component $a$ is moved slightly forward relative to the other components, as already mentioned above, so that the space $S_1$ would be slightly greater than that indicated in Table 5. The maximum range of focusing movement (as distinguished from zooming movement) of the component $a$, when changing the focus from an object at infinity to an object at 6 feet, is approximately 9.5 millimeters.

Table 5

| $S_1$ | $S_3$ | EF | $S_1$ | $S_3$ | EF |
| --- | --- | --- | --- | --- | --- |
| Mm. | Mm. | Mm. | Mm. | Mm. | Mm. |
| 1.50 | 61.10 | 30.19 | 46.62 | 36.00 | 80.09 |
| 3.00 | 59.79 | 30.83 | 47.96 | 34.00 | 84.22 |
| 4.00 | 59.58 | 31.26 | 49.18 | 32.00 | 88.39 |
| 8.00 | 58.67 | 33.15 | 50.28 | 30.00 | 92.52 |
| 12.00 | 57.63 | 35.31 | 51.29 | 28.00 | 96.65 |
| 16.00 | 56.45 | 37.75 | 52.22 | 26.00 | 100.80 |
| 20.00 | 55.10 | 40.54 | 53.08 | 24.00 | 104.96 |
| 24.00 | 53.53 | 43.79 | 53.87 | 22.00 | 109.07 |
| 28.00 | 51.70 | 47.60 | 54.60 | 20.00 | 113.21 |
| 32.00 | 49.50 | 52.15 | 55.29 | 18.00 | 117.38 |
| 36.00 | 46.84 | 57.65 | 55.92 | 16.00 | 121.52 |
| 38.00 | 45.28 | 60.88 | 56.51 | 14.00 | 125.65 |
| 39.00 | 44.44 | 62.22 | 57.07 | 12.00 | 129.81 |
| 39.09 | 44.36 | 62.77 | 57.59 | 10.00 | 133.95 |
| 39.51 | 44.00 | 63.53 | 58.09 | 8.00 | 138.11 |
| 40.27 | 43.30 | 64.97 | 58.55 | 6.00 | 142.25 |
| 41.61 | 42.00 | 67.66 | 58.98 | 4.00 | 146.38 |
| 42.94 | 40.60 | 70.56 | 59.19 | 3.00 | 148.46 |
| 44.08 | 39.30 | 73.26 | 59.29 | 2.50 | 149.50 |
| 45.13 | 38.00 | 75.93 | 59.39 | 2.00 | 150.54 |

A lens according to the above specific example of Table 4 is shown diagrammatically in FIG. 1, the axially movable elements being illustrated in an intermediate zoom position such as to produce an equivalent focal length of about 62 mm. Certain numerical data for the specific example are repeated in FIG. 2.

Variations in the dimensions given in the above specific example are possible, but such variations, so far as lens elements 1-7 are concerned, should preferably be kept within the proportional limits or ranges previously mentioned. The other elements, to the rear of element 7 and collectively constituting the rear group or rear member, are capable of great variations not only in dimensions but also in number and form, as already mentioned.

The lens is well adapted to remote controlled motor drive or auto zoom operation, since the back focus remains constant at all variations of focal length and the production of the zoom effect requires only two different axial motions, one for moving the component $a$ and the other for moving the combined components $b$ and $c$ together. Moreover, lenses of relatively modest diameter may be used.

Also it is to be noted that the present invention enables a relatively large change in focal length and magnification power, without substantial loss of image quality even at the extremes of variation. In the illustrative example, the ratio of maximum to minimum focal length is approximately 5 to 1, which is substantially greater than the ratio that can be achieved with many of the variable lenses of the prior art.

The elements 1 and 2 have been described above as constituting a cemented doublet. However, it is within the scope of this invention to space the elements 1 and 2 from each other by a very slight space, of the order of magnitude of 0.15 millimeter, and it is found that this reduces the spherical aberration of the system. This spacing of the first two components requires slight changes in some of the other elements, but only within the limits or ranges already indicated above.

What is claimed is:
1. An objective lens of variable magnification power, including a first component of two lens elements cemented together to form a front doublet, a second component of two lens elements cemented together to form another doublet spaced rearwardly from the front doublet, a third component of a single lens element spaced rearwardly from the second component, a fourth component of two lens elements cemented together to form a doublet spaced rearwardly from the third component, said four components together forming a front member wherein the first component is axially movable and the second and third components together are axially movable as a unit but differently from the axial movement of the first component, to vary the equivalent focal length and magnification power of the lens, and a rear member of a plurality of lens elements spaced rearwardly from said fourth component, the characteristics of the lens elements of the front member and their spatial relationship to each other being substantially in the proportions indicated by the data in the following table:

| Lens | N | V | Radii, mm. | Thicknesses, mm. |
| --- | --- | --- | --- | --- |
| 1 | 1.517 | 64.5 | $R_1 = +71.5$ | $T_1 = 9.5$ |
|   |       |      | $R_2 = -50.0$ | $T_2 = 2.0$ |
| 2 | 1.617 | 36.6 | $R_3 = -205.74$ | |
|   |       |      |                 | $S_1$ = variable |
| 3 | 1.720 | 29.3 | $R_4 = +272.0$ | $T_3 = 6.5$ |
|   |       |      | $R_5 = -72.75$ | $T_4 = 2.5$ |
| 4 | 1.541 | 59.9 | $R_6 = +27.5$ | |
|   |       |      |                | $S_2 = 7.0$ |
|   |       |      | $R_7 = -40.25$ | |
| 5 | 1.523 | 50.6 | $R_8 = +234.0$ | $T_5 = 2.0$ |
|   |       |      |                | $S_3$ = variable |
|   |       |      | $R_9 = +177.3$ | |
| 6 | 1.617 | 36.6 | $R_{10} = +50.0$ | $T_6 = 2.05$ |
| 7 | 1.517 | 64.5 | $R_{11} = -71.5$ | $T_7 = 7.25$ | wherein the lens elements are numbered in order from front to rear in the first column, the corresponding refractive indices N for the D line of the spectrum are given in the second column, the corresponding dispersive indices V are given in the third column, the radii of curvature R of the lens surfaces are given in the fourth column, the respective surfaces being numbered from front to rear and being respectively identified by the subscript numeral used with each R, with plus and minus values of R indicating curved surfaces which are respectively convex and concave toward the front of the lens, the axial thicknesses T of the respective lens elements and the axial thicknesses S of the air spaces between successive spaced elements being given in the fifth column, the respective lens element thicknesses and air spaces being separately numbered from front to rear and being respectively identified by numerical subscripts used with each T and S.

2. An objective lens of variable magnification power, including a first component of two lens elements relatively close together, a second component of two lens elements cemented together to form a doublet spaced rearwardly from the front doublet, a third component of a single lens element spaced rearwardly from the second component, a fourth component of two lens elements cemented together to form a doublet spaced rearwardly from the third component, said four components together forming a front member wherein the first component is axially movable and the second and third components together are axially movable as a unit but differently from the axial movement of the first component, to vary the equivalent focal length and magnification power of the lens, and a rear member of a plurality of lens elements spaced rearwardly from said fourth component, the characteristics of the glass of the lens elements of the front member being substantially as indicated by the N and V data in the following table, and the radii of curvature of the surfaces thereof being substantially within the dimensional limits given in the following table:

| Lens | N | V | Radii, mm. |
|---|---|---|---|
| 1 | 1.517 | 64.5 | $50 < R_1 < 90$ |
| 2 | 1.617 | 36.6 | $-40 < R_2 < -70$ |
|   |       |      | $-125 < R_3 < \infty$ |
|   |       |      | $100 < R_4 < \infty$ |
| 3 | 1.720 | 29.3 | $-50 < R_5 < -90$ |
| 4 | 1.541 | 59.9 | $20 < R_6 < 35$ |
|   |       |      | $-20 < R_7 < -80$ |
| 5 | 1.523 | 50.6 | $100 < R_8 < \infty$ |
|   |       |      | $100 < R_9 < \infty$ |
| 6 | 1.617 | 36.6 | $40 < R_{10} < 70$ |
| 7 | 1.517 | 64.5 | $-50 < R_{11} < -90$ | wherein the lens elements are numbered from front to rear in the first column, the refractive indices N for the D line of the spectrum are given in the second column, the corresponding dispersive indices V are given in the third column, and the radii of curvature of the respective lens surfaces are indicated by R with numerical subscripts identifying individual lens surfaces numbered consecutively in order from front to rear.

References Cited in the file of this patent

UNITED STATES PATENTS

| | | |
|---|---|---|
| 2,847,907 | Angenieux | Aug. 19, 1958 |
| 2,937,572 | Yomaii | May 24, 1960 |